J. D. MURPHY.
Gun-Carriage Wheel.
No. 27,733. Patented Apr. 3, 1860.
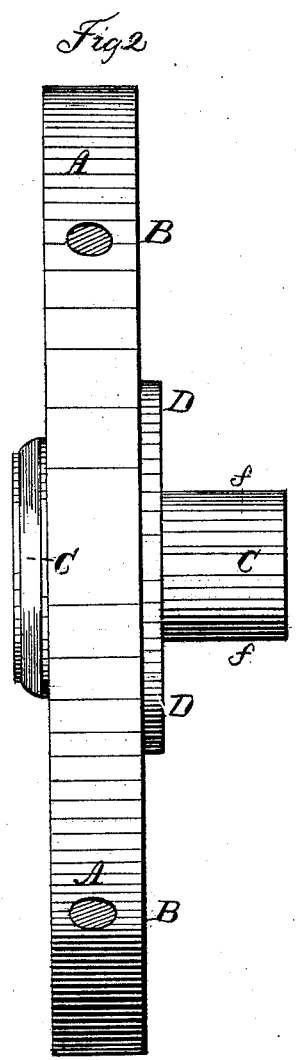
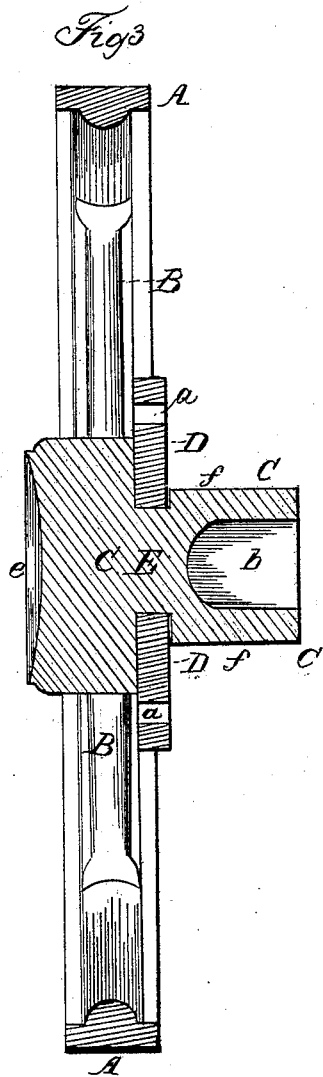
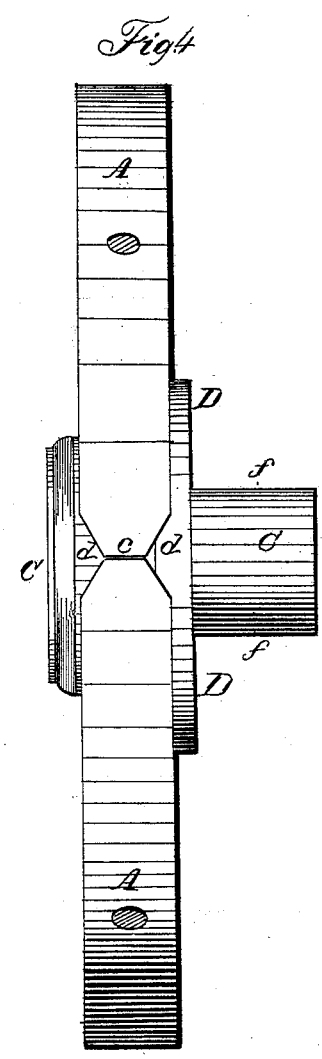
Witnesses.
Thos. H. Dodge
A. C. Modicomb
Inventor.
John D. Murphy

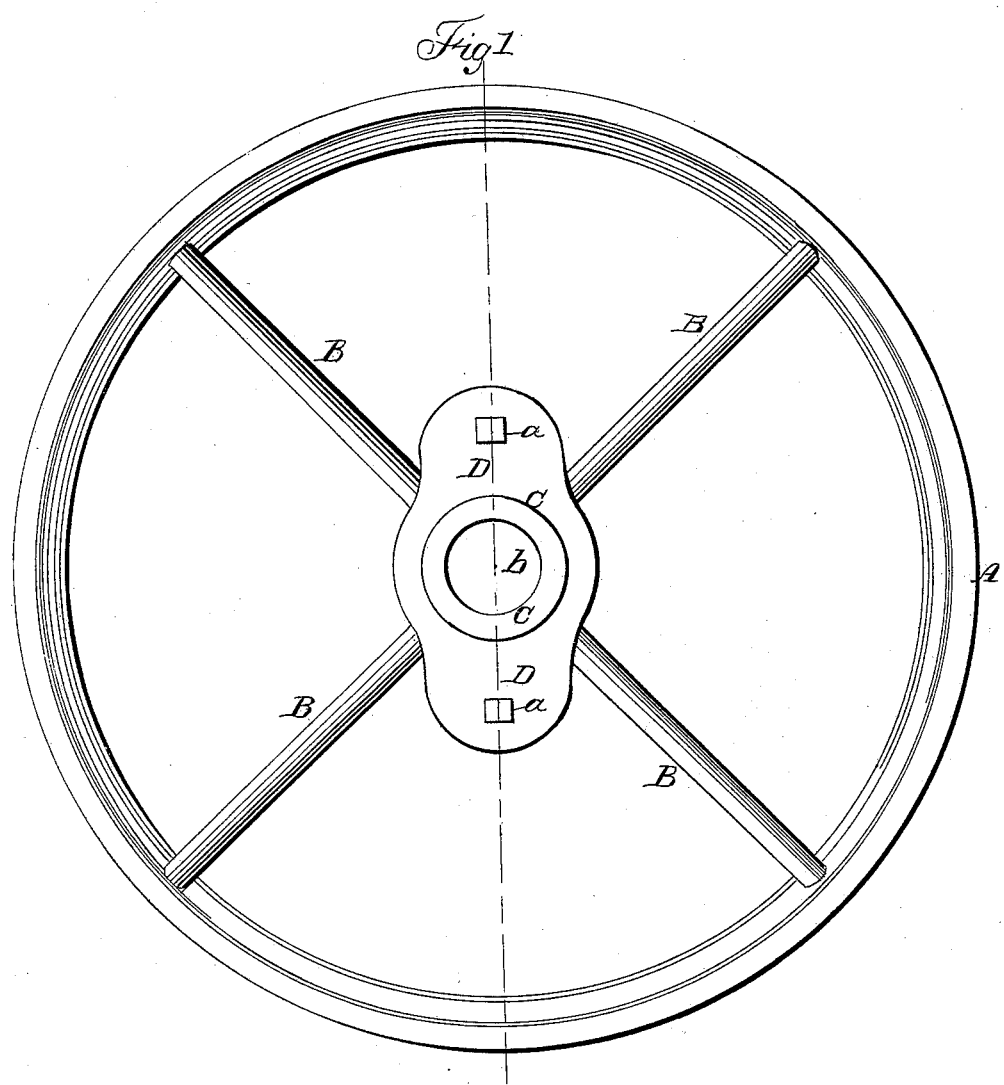

UNITED STATES PATENT OFFICE.

JOHN D. MURPHY, OF BALTIMORE, MARYLAND.

WHEEL FOR FLYING ARTILLERY-CARRIAGES.

Specification of Letters Patent No. 27,733, dated April 3, 1860.

*To all whom it may concern:*

Be it known that I, JOHN D. MURPHY, of the city of Baltimore, in the State of Maryland, have invented certain new and useful Improvements in Wheels for Flying Artillery-Carriages; and I do hereby declare that the following is a full, clear, and exact description thereof, reference being had to the accompanying drawings, and to the letters of reference marked thereon, forming a part of this specification, in which—

Figure 1, represents an inside view of the wheel, complete. Fig. 2, represents an edge view of a complete wheel. Fig. 3, represents a section on line A B, Fig. 1, and Fig. 4 represents an edge view of the wheel after the hub has been cast, but before the tire or rim has been welded.

A, is the tire, tread or rim of the wheel— being made of wrought iron. B, B, are the spokes, also of wrought iron.

C, is the cast iron hub, which is cast on the inner ends of the spokes after they have been loosely fitted to the rim A.

D, is a loose iron flange having any suitable number of bolt holes $a$, $a$, and a round hole in which turns or works the part E, of the hub C.

The operation of constructing my improved wheel is as follows:—The tire or rim A, having been bent or curved into the proper form, is punched or drilled with holes to receive the ends of the spokes B, which are cut or formed so that one end will enter the holes in the rim A, until a shoulder formed on the outer end of each spoke, strikes against the inner surface or periphery of the rim. The outer ends of the spokes B, are then inserted in the rim A, so that their inner ends will project toward the center of the wheel—the length of the spokes being such that their inner ends will not quite meet or touch each other. The rim A, together with the spokes B, are now placed in the sand or molding box, and the hub C, cast on the inner ends of the spokes by the ordinary mode of casting.

The hub C, is cast with a bearing surface $f$, on the inner side of the wheel which answers the purpose of an axle to sustain the body of the carriage. The bearing surface $f$, may turn in iron or wooden boxes or bearings formed or attached to the sides of the carriage. To hold the wheels in place a groove may be cast or turned in the part $f$, into which a pin can be passed through the boxes. I prefer, however, to use the flange D. The flange D, may be of any desired form or shape, having a hole through its center. It is attached to the hub by being placed in the sand before the hub C, is cast, in such a position as that when the hub C. is cast, the metal forming the hub, will run through the hole in the flange and form the bearing surface E, and also on each side to form shoulders, all as fully shown in the drawings. To attach a wheel thus constructed, the part $f$, is run or slipped into suitable bearings in the side of the carriage until the flange D, comes up against the side thereof, when the flange is firmly secured by bolts or screws passing through holes $a$, and into the sides of the carriage.

It will thus be seen, that the flanges D, not only keep the wheels securely in place, but at the same time cause a large portion of the weight to be borne by the bearing surface E, which is nearly over the center of the wheels.

To prevent the metal adhering or sticking to the flange D, when the hub C, is cast, I use a mixture composed of ground or fine pumice stone and molasses. This mixture should be rubbed on or over all the parts of the flange D, which come in contact with the hub part C, and well dried before the flange D, is placed in the sand, and it is a good plan to turn the flange D, just as soon the metal forming the hub C, is firmly "set".

The tire or rim A, is left open, as seen at $c$, Fig. 4 until after the hub is cast, thus allowing the spokes to expand and contract during the process of casting the hub C.

The advantages of the hub thus cast are set forth in the patent granted to me on the 19th day of April 1859, for improvements in iron wheels.

I find it a good plan to leave the ends of the rim or tire in the form shown in Fig. 4, and then insert a piece of metal on each side at the points $d$, $d$, when the tire is welded. After the hub C, is cast, the tire is welded, and then the ends of the spokes (which should be so made as to project through the rim a little) are riveted down.

My wheel is well adapted to a great many purposes, and I therefore do not confine myself to their use for artillery carriages but propose to use them wherever applicable. It can be applied to agricultural carriages, also to railroad cars; also to children's carriages with iron or wooden rims, and to truck carriages for scales, and similar purposes. In applying the wheel to some uses, the solid hub may be cast with a gear, or a gear may be cast around the rim A. If preferred, however, for railroad uses, an iron rim with a flange may be cast around the wrought iron rim A, and for driving wheels, a wrought iron crank or wrist may be inserted in the mold before the solid hub is cast, so as to be firmly connected therewith by the metal as it cools.

The hub C, may be cast with depressions c, and b, without weakening the wheel if preferred. The hub of my wheel being solid, is consequently very strong and not liable to be broken while at the same time it is made to answer the purpose of an angle. It can be applied to gun carriages in a simple and cheap manner, and will endure great strain and rough use, and is not seriously affected by heat or cold nor by moisture as are wooden wheels.

Having described my improved wrought and cast iron wheel, what I claim as new and desire to secure by Letters Patent, is:

1. The combination of the solid hub C, with the spokes B, substantially as set forth.

2. I claim the combination and arrangement of the flange D, or its equivalent, with the hub C, substantially as set forth.

In witness whereof I have hereunto signed my name.

JOHN D. MURPHY.

Witnesses:
   THOS. W. DODGE,
   A. C. WIDDICOMBE.